US010931838B2

(12) United States Patent
Kodama

(10) Patent No.: US 10,931,838 B2
(45) Date of Patent: Feb. 23, 2021

(54) INFORMATION PROCESSOR, AND COMPUTER-READABLE RECORDING MEDIUM STORING SETTING CONTROL PROGRAM AND SETTING CONTROL METHOD FOR INFORMATION PROCESSOR

(71) Applicant: SHARP KABUSHIKI KAISHA, Sakai (JP)

(72) Inventor: Naoki Kodama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/658,410

(22) Filed: Oct. 21, 2019

(65) Prior Publication Data
US 2020/0128144 A1  Apr. 23, 2020

(30) Foreign Application Priority Data

Oct. 22, 2018  (JP) .............................. JP2018-198168

(51) Int. Cl.
*H04N 1/00* (2006.01)
(52) U.S. Cl.
CPC . *H04N 1/00411* (2013.01); *H04N 2201/0094* (2013.01)
(58) Field of Classification Search
CPC ................... H04N 1/00411; H04N 2201/0094
USPC ....................................................... 358/1.13
See application file for complete search history.

(56) References Cited

U.S. PATENT DOCUMENTS

| 8,115,939 B2* | 2/2012 | Yamada ................. G06K 15/02 358/1.13 |
| 2006/0055968 A1* | 3/2006 | Sato .................... H04N 1/32358 358/1.15 |
| 2011/0199628 A1* | 8/2011 | Tohki ................... H04N 1/0035 358/1.13 |
| 2016/0267364 A1* | 9/2016 | Ishida .................. G06K 15/022 |
| 2016/0277619 A1* | 9/2016 | Asai .................... H04W 52/028 |
| 2016/0344899 A1* | 11/2016 | Villamora .......... H04N 1/00411 |
| 2017/0085729 A1* | 3/2017 | Yoshida ............. H04N 1/00474 |
| 2020/0082195 A1* | 3/2020 | Agarwal ............ H04N 1/00129 |

FOREIGN PATENT DOCUMENTS

JP  2009-037017 A  2/2009

* cited by examiner

*Primary Examiner* — Allen H Nguyen
(74) *Attorney, Agent, or Firm* — ScienBiziP, P.C.

(57) ABSTRACT

A multifunction peripheral according to the present invention includes a plurality of operation modes such as a copy mode and an image scanner mode. The multifunction peripheral has a job program function of registering setting details of an operating condition for an arbitrary operation mode as a job program, and enabling the same state as that at the time of registering the job program to be reproduced by invoking the registered setting when necessary. That is, according to the job program function, the operation mode, setting details, and an operation screen at the time of registering the setting are reproduced. This feature greatly contributes to improving the operability of the multifunction peripheral.

7 Claims, 18 Drawing Sheets

| No. | PROGRAM NAME | OPERATION MODE | SETTING DETAILS |||
|---|---|---|---|---|---|
| | | | SAVE LOCATION LINK TRANSMISSION | RESOLUTION | ----- |
| ⋮ | ⋮ | ⋮ | ⋮ | ⋮ | ⋮ |

INFORMATION PROCESSOR, AND COMPUTER-READABLE RECORDING MEDIUM STORING SETTING CONTROL PROGRAM AND SETTING CONTROL METHOD FOR INFORMATION PROCESSOR

BACKGROUND OF THE INVENTION

Field of the Invention

The present invention relates to an information processor, and a setting control program and a setting control method for the information processor, more particularly, to an information processor having a plurality of operation modes, and a setting control program and a setting control method for such an information processor.

Description of the Background Art

As an information processor having a plurality of operation modes, a multifunction peripheral (MFP), for example, is known. More specifically, the multifunction peripheral is provided with multiple functions such as a copy function, a printer function, an image scanner function, and a facsimile function, and includes a plurality of operation modes corresponding to these multiple functions. In the multifunction peripheral as described above, a configuration in which details (condition) set in an arbitrary operation mode are registered, and the registered setting that can be invoked when necessary may be provided. As an example of the above, Japanese Unexamined Patent Application Publication No. 2009-37017 discloses a technique for a copy mode in a multifunction peripheral, whereby the details set on a basic screen of the copy mode are registered, and the basic screen reflecting the registered setting details is displayed when the registered setting details are read.

As described above, Japanese Unexamined Patent Application Publication No. 2009-37017 discloses a technique for a single operation mode, which is a copy mode in a multifunction peripheral, whereby the details set on a basic screen thereof are registered, and the basic screen reflecting the registered setting details is displayed when the registered setting details are read. However, Japanese Unexamined Patent Application Publication No. 2009-37017 identified above does not disclose in any way a case of invoking, for example, the details set in a certain operation mode from another operation mode. Conceiving ways to deal with such a case is extremely important for an information processor having a plurality of operation modes such as a multifunction peripheral, especially from the standpoint of improving the operability of the information processor.

Hence, an object of the present invention is to provide a new technique whereby operability of an information processor having a plurality of operation modes can be improved.

SUMMARY OF THE INVENTION

In order to achieve the above object, the present invention includes a first invention related to an information processor, a second invention related to a screen display control program for an information processor, and a third invention related to a screen display control method for an information processor.

The first invention related to an information processor of the above inventions is based on the premise that the information processor includes a plurality of operation modes. With the above premise, the first invention comprises a setter, a display, a first display controller, a storage, an invoker, and a setting controller. The setter sets an operating condition for an arbitrary operation mode in accordance with a setting operation by a user. The display includes a display surface. The first display controller displays setting information representing setting details of the operating condition set by the setter on the display surface of the display. The storage stores the setting details set by the setter in response to a registration operation by the user. The invoker invokes, in response to an invoking operation by the user, the setting details according to the invoking operation from the storage. Further, the setting controller sets the operating condition according to the setting details invoked by the invoker, and the operation mode corresponding to the operating condition, and displays the setting information representing the setting details on the display surface of the display.

Note that in the first invention, the invoker can invoke the setting details of an operation mode different from the operation mode currently set. In other words, the invoker can invoke the setting details of a certain operation mode from another operation mode.

Further, in the first invention, a second display controller may further be provided. The second display controller displays list information, which is a list of setting details stored in the storage, on the display surface of the display.

Furthermore, in the first invention, an operation receptor may further be provided. The operation receptor receives the setting operation, the registration operation, and the invoking operation described above. Preferably, the operation receptor as described should include a touch panel provided to overlap the display surface of the display.

The information processor according to the first invention includes, for example, a multifunction peripheral.

A setting control program for an information processor stored in a computer-readable recording medium according to the second invention of the present invention is based on the premise that the information processor includes a plurality of operation modes. With the above premise, the second invention causes a computer of the information processor to implement a setting procedure, a first display control procedure, a storage procedure, an invoking procedure, and a setting control procedure. In the setting procedure, an operating condition for an arbitrary operation mode is set in accordance with a setting operation by a user. In the first display control procedure, setting information representing setting details of the operating condition according to the setting procedure is displayed on a display surface of a display of the information processor. In the storage procedure, the setting details according to the setting procedure are stored in a storage of the information processor in response to a registration operation by the user. In the invoking procedure, in response to an invoking operation by the user, the setting details according to the invoking operation are invoked from the storage. Further, in the setting control procedure, the operating condition according to the setting details invoked in the invoking procedure, and the operation mode corresponding to the operating condition are set, and the setting information representing the setting details is displayed on the display surface of the display.

A setting control method for an information processor according to the third invention of the present invention is based on the premise that the information processor includes a plurality of operation modes. With the above premise, the third invention includes a setting step, a first display control step, a storage step, an invoking step, and a setting control step. In the setting step, an operating condition for an arbitrary operation mode is set in accordance with a setting operation by a user. In the first display control step, setting information representing setting details of the operating condition set in the setting step is displayed on a display surface of a display of the information processor. In the storage step, the setting details set in the setting step are stored in a storage of the information processor in response to a registration operation by the user. In the invoking step, in response to an invoking operation by the user, the setting details according to the invoking operation are invoked from the storage. Further, in the setting control step, the operating condition according to the setting details invoked in the invoking step, and the operation mode corresponding to the operating condition are set, and the setting information representing the setting details is displayed on the display surface of the display.

According to the present invention as described above, in an information processor having a plurality of operation modes such as a multifunction peripheral, the operability can be improved.

BRIEF DESCRIPTION OF THE DRAWINGS

FIG. 7 is a diagram conceptually representing a structure of a job program table in one embodiment of the present invention;

DESCRIPTION OF THE PREFERRED EMBODIMENTS

Figure 1:
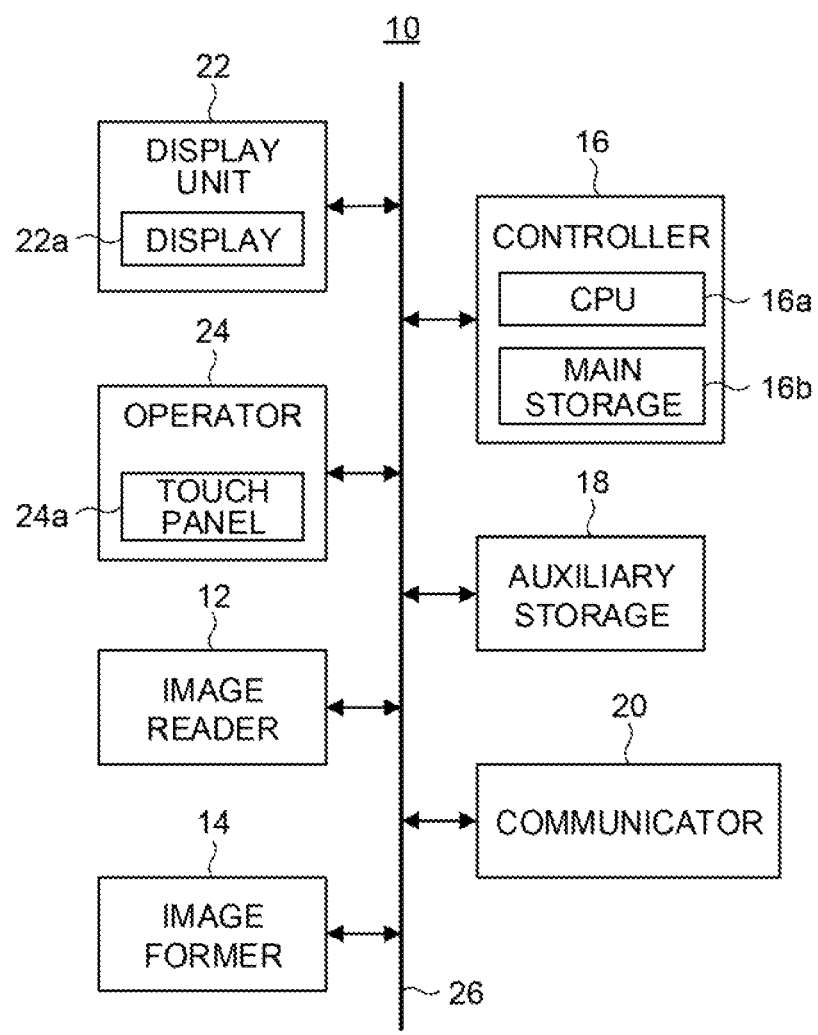
FIG. 1 is a block diagram showing the electrical configuration of a multifunction peripheral according to one embodiment of the present invention.

One embodiment of the present invention will be described by taking a multifunction peripheral 10 shown in FIG. 1 as an example.

The multifunction peripheral 10 according to the present embodiment is provided with a plurality of functions such as a copy function, a printer function, an image scanner function, and a facsimile function. Therefore, the multifunction peripheral 10 includes an image reader 12, an image former 14, a controller 16, an auxiliary storage 18, a communicator 20, a display unit 22, and an operator 24, The above elements are connected to each other via a common bus 26.

The image reader 12 is an example of image reading means. That is, the image reader 12 is in charge of image reading processing of reading an image of a document (not shown), and outputting two-dimensional image data according to the image of the document. The image reader 12 as described above includes a document placement table (not shown) on which a document is placed. In addition, the image reader 12 is provided with an image reader including a light source (not shown), a plurality of mirrors, an imaging lens, a line sensor, and the like. Further, the image reader 12 includes a driving mechanism (not shown) which moves the image reader. Also, the image reader 12 may be provided with an automatic document feeder (Auto Document Feeder: ADF), which is not shown. The image reader 12 serves to realize, in particular, the copy function, the image scanner function, and the facsimile function (fax transmission function).

The image former 14 is an example of image forming means. That is, the image former 14 is in charge of image forming processing of forming an image on a sheet-like image recording medium, such as a sheet of paper (not shown), by a well-known electrophotographic method. The image former 14 as described above includes a photosensitive drum, a charging device, an exposure device, a developing device, a transfer device, a fixing device, etc., not shown. A sheet on which an image has been formed by the image forming processing performed by the image former 14, in other words, a printed material, is discharged to a paper output tray (not shown). Note that the image former 14 may be able to execute not only black-and-white image forming processing, but also color image forming processing. Further, the image former 14 may adopt an ink-jet method, for example, not limited to the electrophotographic method. The image former 14 serves to realize, in particular, the copy function, the printer function, and the facsimile function (fax reception function).

The controller 16 is an example of control means for managing the overall control of the multifunction peripheral 10. Accordingly, the controller 16 includes a central processing unit (CPU) 16a as control execution means. In addition, the controller 16 includes a main storage 16b, as main storage means, to which the CPU 16a can directly access. The main storage 16b includes a read-only memory (ROM) and a random-access memory (RAM), not shown, and also includes a rewritable nonvolatile memory such as a flash memory. In the ROM of the above, a control program (firmware) for controlling the operation of the CPU 16a is stored. The RAM constitutes a work area and a buffer area for use when the CPU 16a executes processing based on the control program. Further, in the rewritable nonvolatile memory, data that can be potentially rewritten, such as a job program table 500 to be described later, is stored.

The auxiliary storage 18 is an example of auxiliary storage means, and includes, for example, a hard disk (not shown). Also, the auxiliary storage 18 may include a rewritable nonvolatile memory different from that in the main storage 16h. In the auxiliary storage 18, various kinds of data, such as image data output from the image reader 12, and data received via the communicator 20 which will be described later, are stored as necessary.

The communicator 20 is an example of communication means in charge of bidirectional communication processing via a communication line such as a public telephone line or a network (not shown). Connection between the communicator 20 and the communication line may be wired or wireless. The communicator 20 serves to realize the printer function, the facsimile function, and the image scanner function (an e-mail transmission function to be described later), in particular.

The display unit 22 includes a display 22a as an example of display means. The display 22a is, for example, a liquid crystal display (LCD), but is not limited to this, and may be an organic electroluminescent (EL) display or the like. Apart from the display 22a, the display unit 22 also includes a suitable light-emitting element such as a light emitting diode (LED), which is not shown.

The operator 24 is an example of operation reception means for receiving a user operation, and includes, in particular, a sheet-like touch panel 24a. The touch panel 24a is provided on a display surface of the display 22a in an overlapping manner. The touch panel 24a is a capacitive touch panel. However, the touch panel 24a is not limited to a capacitive type, and the other types of touch panels such as electromagnetic induction type, resistive type, and infrared type touch panels may be employed. Apart from the touch panel 24a, the operator 24 also includes a suitable hardware switch such as a push-button switch, which is not shown.

The multifunction peripheral 10 according to the present embodiment is provided with a plurality of functions as described above, and includes a plurality of operation modes corresponding to the plurality of functions. For example, an operation mode called a copy mode is provided according to the copy function. Further, a printer mode is provided according to the printer function. Furthermore, an image scanner mode is provided according to the image scanner function. As an extended function of the image scanner function, an e-mail transmission function, for example, can be employed. The e-mail transmission function is a function of transmitting image data obtained by the image scanner function (i.e., the image reading processing performed by the image reader 12) via e-mail. An e-mail transmission mode is provided according to the e-mail transmission function. Also, as another extended function of the image scanner function, a shared folder transmission function, for example, can be employed. The shared folder transmission function is a function of transmitting (saving) the image data obtained by the image scanner function to (in) a predesignated shared folder. A shared folder transmission mode is provided according to the shared folder transmission function. As regards the facsimile function, the fax transmission function and the fax reception function are available. A fax transmission mode is provided according to the fax transmission function of these functions, and a fax reception mode is provided according to the fax reception function.

In addition, the multifunction peripheral 10 according to the present embodiment is provided with a job program function of registering setting details of an operating condition for an arbitrary operation mode, and being able to invoke the registered setting when necessary. By the job program function, the registered setting details can be invoked from the same operation mode as that employed at the time of registering the setting details, or can be invoked from an operation mode different from that employed at the time of the registration. In either case, an operating condition according to the invoked setting details, and an operation mode corresponding to the operating condition are set. In addition, an operation screen according to the invoked setting details is displayed on the display 22a. In other words, the state at the tune of registering the setting is reproduced.

As a specific example, a case where certain setting details of an operating condition for an e-mall transmission mode are registered, and the setting details are invoked from a fax transmission mode different from the e-mail transmission mode will be described.

Figure 2:
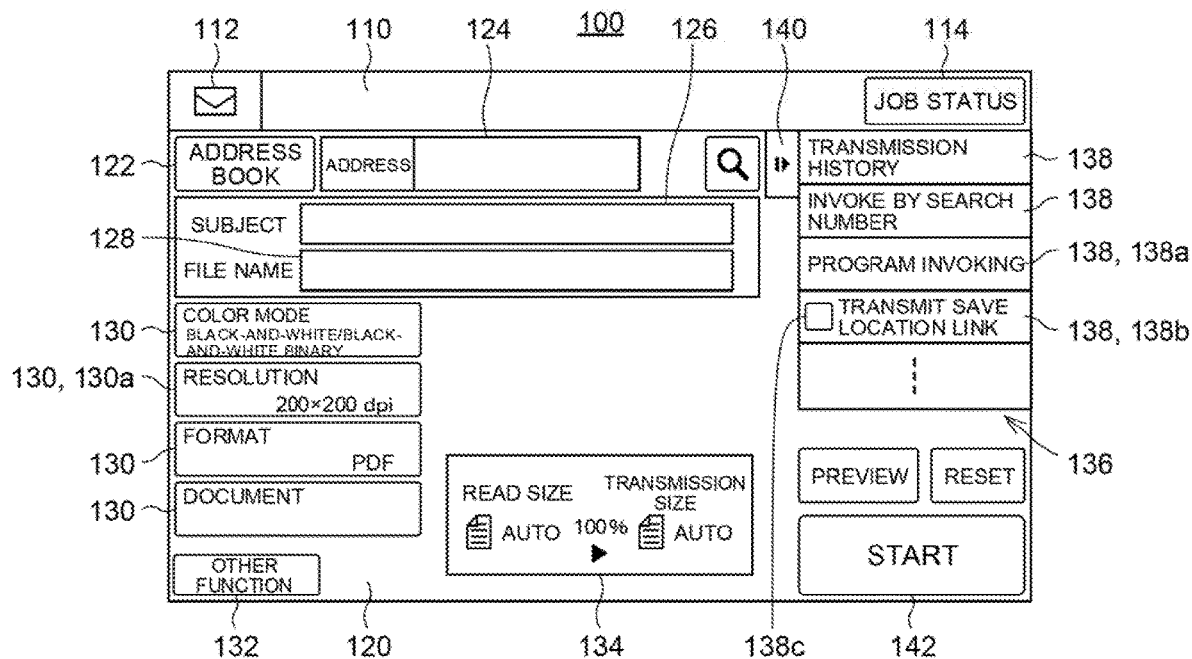
FIG. 2 is an illustration showing an example of the initial state of an e-mail transmission screen in one embodiment of the present invention.

First, in the e-mail transmission node, an e-mail transmission screen 100 as shown in FIG. 2 is displayed on the display 22a, as the operation screen. Note that the e-mail transmission screen 100 illustrated in FIG. 2 shows the initial state of the e-mail transmission screen 100.

The e-mail transmission screen 100 includes a strip-shaped display area 110, and a main display area 120. Of the above areas, the strip-shaped display area 110 is a horizontally long strip-shaped area occupying the upper portion of the e-mail transmission screen 100. At a left end portion of the strip-shaped display area 110, a mode mark 112 appropriate as a title mark of the e-mail transmission screen 100 is disposed. In addition, at a right end portion of the strip-shaped display area 110, a job status confirmation button 114 for confirming the current job status is disposed.

Meanwhile, the main display area 120 is an area other than the strip-shaped display area 110 of the e-mail transmission screen 100. In other words, the main display area 120 is a rectangular area occupying most of the e-mail transmission screen 100. At an upper left portion of the main display area 120, an address book button 122 for opening an address book is disposed. Since the address book is nothing special, providing detailed explanation thereof is omitted. Further, on the right side next to the address book button 122, a field 124 for entering an e-mail destination (address) is disposed. Furthermore, below the address book button 122 and the field 124 for destination entry, a field 126 for entering a subject of an e-mail, and a field 128 for entering the name of a file to be transmitted via the e-mail (i.e., a file name) are disposed in tandem.

In addition, a plurality of setting buttons 130, 130, . . . are disposed in tandem at a leftward portion of the main display area 120 below the field 128 for file name entry. These setting buttons 130, 130, . . . are operation elements for setting each parameter in the image scanner mode. As one of these setting buttons 130, 130, . . . , a resolution setting button 130a for setting the resolution for reading a document by the image scanner mode, or more strictly speaking, for enabling the aforementioned operation to be proceeded, is provided. Also, to the resolution setting button 130a, a character string representing the currently set reading resolution, more specifically a character string "200×200 dpi" in this case, is assigned. Further, at a lower left portion of the main display area 120 below the arrangement of the respective setting buttons 130, 130, . . . , other function display button 132 for displaying a list of setting buttons other than the respective setting buttons 130, 130, . . . is disposed. Furthermore, in the lower portion of the center of the main display area 120, a display area 134 for displaying the reading size (read size) of a document in the image scanner mode is disposed.

Further, at an upper right portion of the main display area 120, an action panel 136 is disposed. A plurality of buttons 138, 138, . . . are disposed in tandem within the action panel 136. These buttons 138, 138, . . . are operation elements corresponding to detailed functions that can be used in the e-mail transmission mode. As one of these buttons 138, 138, . . . , a program invoking button 138a for invoking the registered setting details, or a job program, in a word, is provided. In addition, a save location link transmission button 138b, which corresponds to the function of transmitting a link for the save location, is provided. The function of transmitting the link for the save location is a function of saving image data obtained by the image scanner function in an appropriate save location such as the auxiliary storage 18 in the e-mail transmission mode, and transmitting information regarding the save location (instead of the image data itself) via an e-mail. Also, a check box 138c is annexed to the save location link transmission button 138b. As will be described later, when the function of transmitting a link for the save location is enabled, a check mark is entered in this check box 138c. In other words, whether the function of transmitting a link for the save location is enabled or disabled is signified by the presence or absence of a check mark in the check box 138c. Further, a tab 140 for opening and closing the action panel 136 is placed at, for example, an upper left portion of the action panel 136.

Furthermore, a start button 142 is disposed at a lower right portion of the main display area 120. The start button 142 is an operation element for starting transmission of an e-mail according to the e-mail transmission mode. That is, as the start button 142 is operated (pressed) after the settings of items necessary for e-mail transmission in the e-mail transmission mode have been completed, the e-mail transmission according to the e-mail transmission mode is started. Note that elements such as various buttons (operation keys) besides the above-described features are disposed on the e-mail transmission screen 100 including the main display area 120 and the strip-shaped display area 110 described above. However, explanation will be omitted for such elements not directly related to the gist of the present invention.

Figure 3:
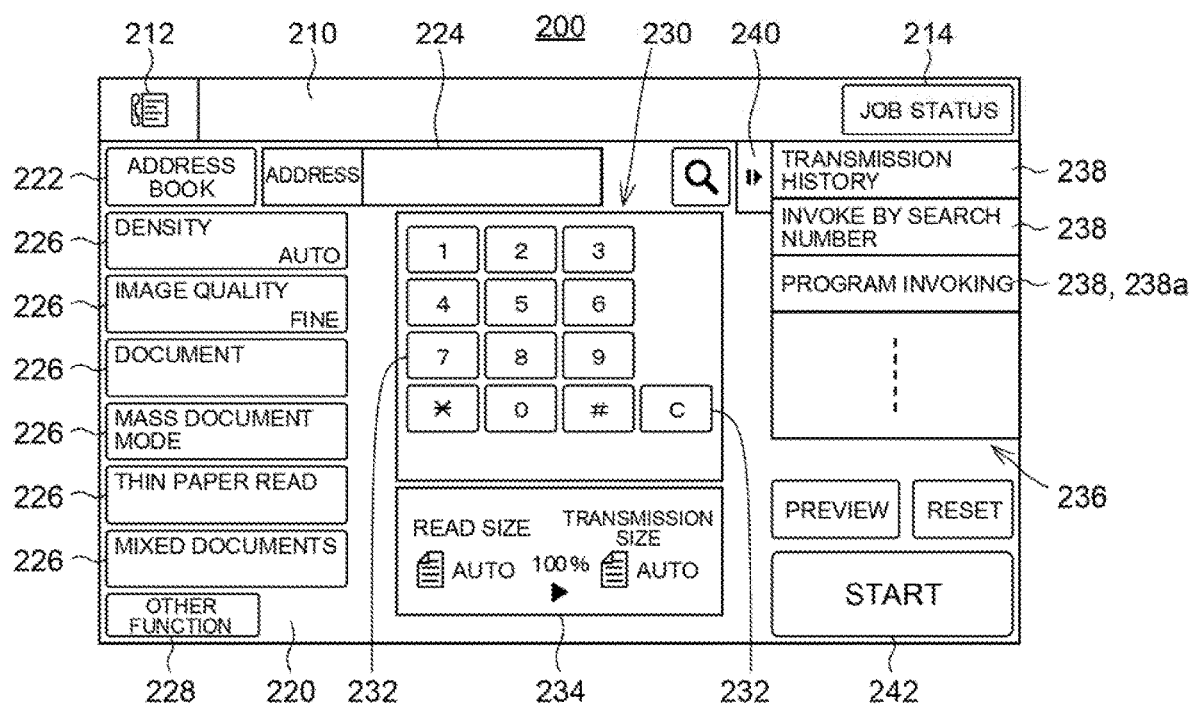
FIG. 3 is an illustration showing an example of the initial state of a fax transmission screen in one embodiment of the present invention.

In contrast, in the fax transmission mode, a fax transmission screen 200 as shown in FIG. 3 is displayed on the display 22a, as the operation screen. Note that the fax transmission screen 200 illustrated in FIG. 3 shows the initial state of the fax transmission screen 200.

As in the e-mail transmission screen 100 described above, the fax transmission screen 200 also includes a strip-shaped display area 210 and a main display area 220. At a left end portion of the strip-shaped display area 210 of these areas, a mode mark 212 appropriate as a title mark of the fax transmission screen 200 is disposed. In addition, at a right end portion of the strip-shaped display area 210, a job status confirmation button 214 similar to that of (the strip-shaped display area 110 of) the e-mail transmission screen 100 is disposed.

Meanwhile, at an upper left portion of the main display area 220, an address book button 222 similar to that of (the main display area 120 of) the e-mail transmission screen 100 is disposed. Further, on the right side next to the address book button 222, a field 224 for entering a fax destination is disposed. Furthermore, a plurality of setting buttons 226, 226, . . . similar to those of the e-mail transmission screen 100 are disposed in tandem at a leftward portion of the main display area 220 below the address book button 222 and the field 224 for destination entry. Further, at a lower left portion of the main display area 220 below the arrangement of these setting buttons 226, 226, . . . , other function display button 228 similar to that of the e-mail transmission screen 100 is disposed.

Moreover, in the central portion of the main display area 220, a numeric keypad 230 is disposed, in other words, a plurality of buttons 232, 232, . . . constituting the numeric keypad 230 are disposed. The numeric keypad 230 is used to directly enter a fax number of a destination device which receives the fax transmission in the field 224 for destination entry. Further, a display area 234 similar to that of the e-mail transmission screen 100 is disposed below the numeric keypad 230.

Furthermore, at an upper right portion of the main display area 220, an action panel 236 is disposed. A plurality of buttons 238, 238, . . . are disposed in tandem within the action panel 236. These buttons 238, 238, . . . are operation elements corresponding to detailed functions that can be used in the fax transmission mode. As one of these buttons 238, 238, . . . , a program invoking button 238a similar to that of the e-mail transmission screen 100 is provided. On the other hand, in the fax transmission mode, unlike to the e-mail transmission mode, the aforementioned function of transmitting a link for the save location is not provided. For this reason, a save location link transmission button corresponding to the function of transmitting the link for the save location is also not provided. A tab 240 for opening and closing the action panel 236 is placed at an upper left portion of the action panel 236.

Furthermore, a start button 242 is disposed at a lower right portion of the main display area 220. The start button 242 is an operation element for starting fax transmission according to the fax transmission mode. That is, as the start button 242 is operated after the settings of items necessary for fax transmission in the fax transmission mode have been completed, the fax transmission according to the fax transmission mode is started. Note that elements such as various buttons besides the above-described features are disposed on the fax transmission screen 200 including the main display area 220 and the strip-shaped display area 210 described above. However, explanation will be omitted for such elements not directly related to the gist of the present invention.

Figure 4:
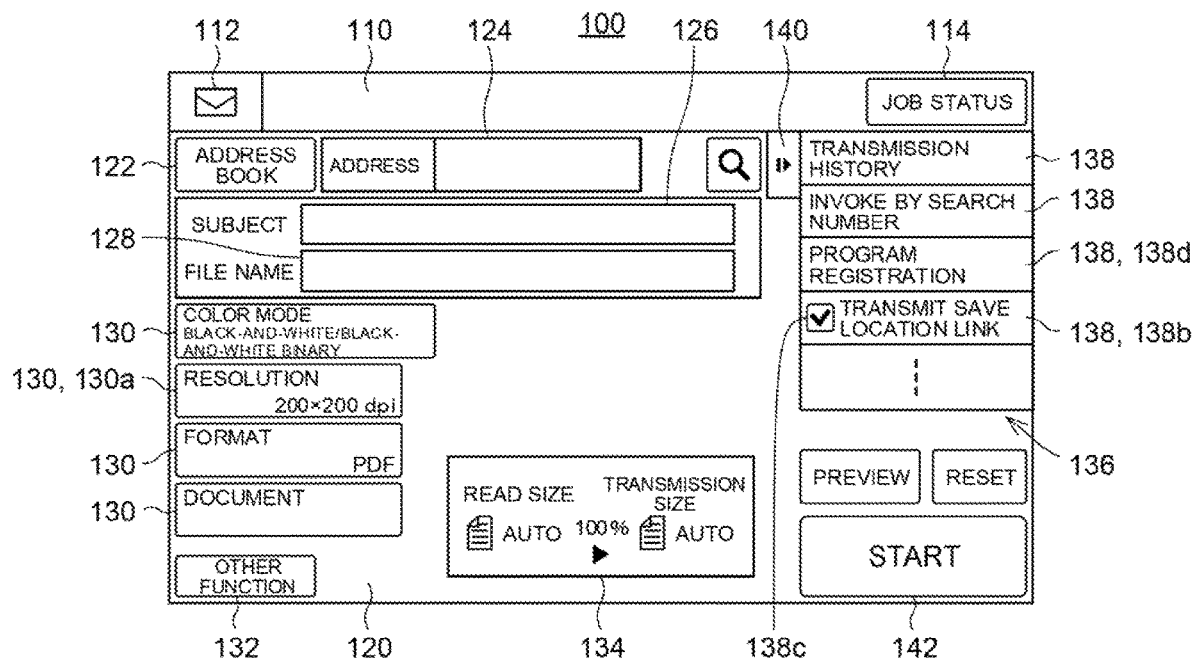
FIG. 4 is an illustration showing an example of another state of the e-mail transmission screen.

Here, for example, it is assumed that the aforementioned function of transmitting a link for the save location is enabled by the operation on the save location link transmission button 138b within the action panel 136, in the e-mail transmission screen 100 shown in FIG. 2. In that case, as shown in FIG. 4, a check mark is entered in the check box 138c annexed to the save location link transmission button 138b, whereby it is signified that the function of transmitting a link for the save location is enabled. In addition, a program registration button 138d is disposed, instead of the aforementioned program invoking button 138a within the action panel 136. The program registration button 138d is an operation element for registering setting details of the operating condition of the e-mail transmission mode through the e-mail transmission screen 100, or more strictly speaking, for enabling the aforementioned operation to be proceeded. Also, in a case where the operating condition for the e-mail transmission mode is changed by an operation other than that of the save location link transmission button 138b, the program registration button 138*d* is similarly disposed, instead of the program invoking button 138*a* within the action panel 136.

Figure 5:
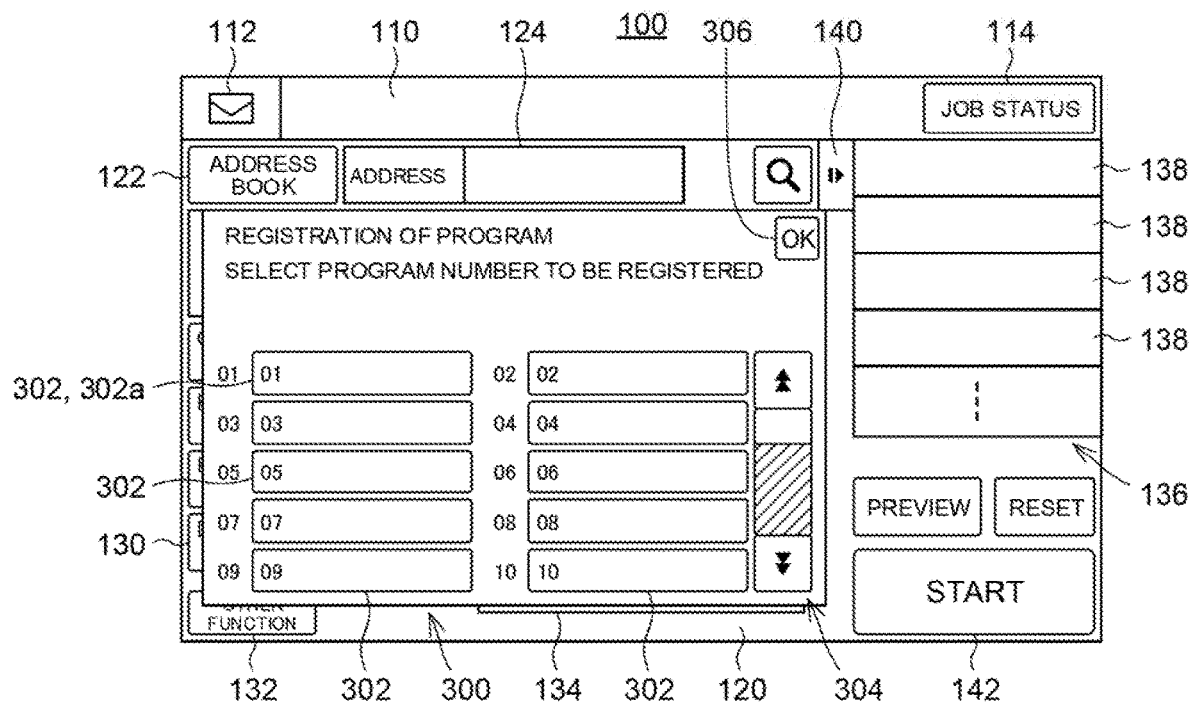
FIG. 5 is an illustration showing an example of a program registration screen in an e-mail transmission mode.

It is assumed that the program registration button 138*d* within the action panel 136 is operated, in order to register the setting details through the e-mail transmission screen 100, on the e-mail transmission screen 100 shown in FIG. 4. In that case, as shown in FIG. 5, a program registration screen 300, which serves as, so to speak, a small screen smaller than the e-mail transmission screen 100, is displayed in such a way as to cover a portion of the e-mail transmission screen 100.

The program registration screen 300 is a screen common to all of the operation modes including the e-mail transmission mode. A plurality of program registration buttons 302, 302, . . . are disposed on the program registration screen 300. Each of the program registration buttons 302 is an operation element for registering setting details of the operating condition of an arbitrary operation mode, or more strictly speaking, for enabling the aforementioned operation to be further proceeded. Although ten program registration buttons 302, 302, . . . are disposed on the program registration screen 300 shown in FIG. 5, a total of forty-eight program registration buttons 302, for example, are prepared for the program registration buttons. In other words, in the multi-function peripheral 10 according to the present embodiment, forty-eight job programs (setting details) at the maximum can be registered. For each job program, an individual program number of "1" to "48" is assigned. Also, a character string representing an arbitrary program name is assigned to each of the program registration buttons 302. In the initial state before a job program is registered, a character string representing the corresponding program number is assigned as the program name.

The program registration buttons 302, 302, . . . are vertically disposed in two lines arranged laterally, for example. Further, on the right side next to the line of program registration buttons 302, 302, . . . , a scroll bar 304 is disposed. By the operation on (a knob or an arrow) of the scroll bar 304, the program registration buttons 302, 302, . . . in line can be scrolled, in other words, all of the program registration buttons 302, 302, . . . can be displayed. In addition, at an upper right portion of the program registration screen 300, an OK button 306 is disposed. When the OK button 306 is operated, the display of the program registration screen 300 is varnished, and the display state of the display 22*a* is returned to the state as shown in FIG. 4. In a state in which the program registration screen 300 is being displayed, the buttons 138, 138, . . . within the action panel 136 are brought into a state of not responding to any of the detailed functions, and thus, for example, no character string is assigned to these buttons.

Figure 6:
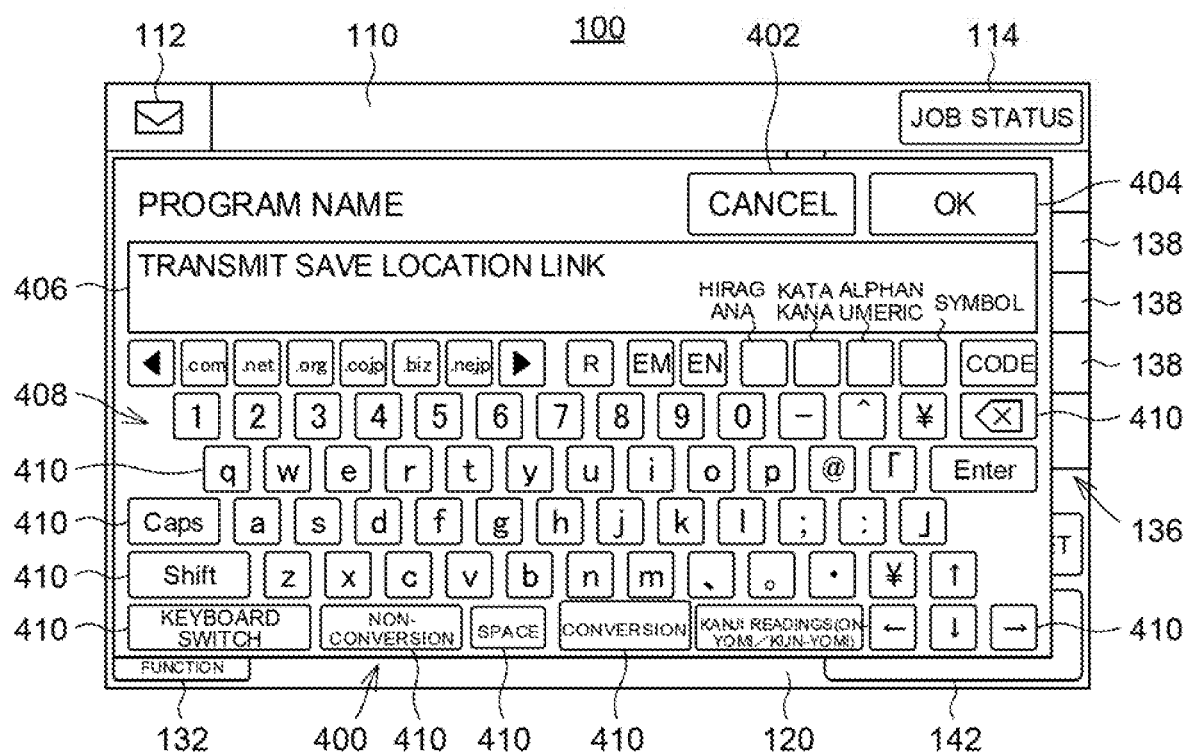
FIG. 6 is an illustration showing an example of a program name setting screen in the e-mail transmission mode.

In the program registration screen 300, it is assumed that an arbitrary program registration button 302 is operated, that is, a program registration button 302*a* corresponding to the program number "1", for example, is operated. In that case, a program name setting screen 400 as shown in FIG. 6 is displayed, instead of the program registration screen 300. On the other hand, when the OK button 306 is operated, the display of the program registration screen 300 is vanished as described above, and the display state of the display 22*a* is returned to the state as shown in FIG. 4.

As shown in FIG. 6, the program name setting screen 400 is also a small screen smaller than the e-mail transmission screen 100, likewise the program registration screen 300, and is displayed in such a way as to cover a portion of the e-mail transmission screen 100. A cancel button 402 and an OK button 404 are disposed side by side at, for example, an upper right portion of the program name setting screen 400. Further, a field 406 for entering an arbitrary program name is disposed below the cancel button 402 and the OK button 404. Note that in FIG. 6, a character string "transmit save location link" is entered in the field 406 for program name entry. However, in the initial state, a character string representing the corresponding program number (the character string "01" in this case) is entered.

Furthermore, a software keyboard 408 is disposed below the field 406 for program name entry, in other words, a plurality of buttons 410, 410, . . . constituting the software keyboard 408 are disposed. As a result of the software keyboard 408 being operated, an arbitrary program name is entered in the field 406 for program name entry described above. Also in a state in which the program name setting screen 400 is being displayed, similarly to the state in which the aforementioned program registration screen 300 is being displayed, the buttons 138, 138, . . . within the action panel 136 are brought into a state of not responding to any of the detailed functions, and thus, for example, no character string is assigned to these buttons. In addition, in a state in which the program name setting screen 400 is being displayed, the main display area 120 including the action panel 136 is displayed relatively dark as compared to the program name setting screen 400, although this cannot be understood from FIG. 6.

It is assumed that the OK button 404, for example, is operated, on the condition that the character string "transmit save location link" has been entered in the field 406 for program name entry, as described above, on the program name setting screen 400. In that case, setting details shown in FIG. 4 are registered as a job program whose program number is "01", in such a state that the setting details are associated with the corresponding operation mode (e-mail transmission mode). More specifically, the program number, the program name, the operation mode, and the setting details are recorded in the job program table 500 as shown in FIG. 7, in such a state that they are associated with each other. The job program table 500 is stored in, for example, the aforementioned rewritable nonvolatile memory of the main storage 16*b*. Further, a small screen, which is a message screen (not shown) indicating that the job program has been registered, is displayed for a certain period (for example, several seconds), in place of the program name setting screen 400. After that, the display state of the display 22*a* is returned to the state shown in FIG. 4. In connection with the above, the present embodiment may be configured such that the registered job program may be set as a shortcut in a favorite folder or on a home screen not shown. On the other hand, when the cancel button 402 is operated, the display of the program name setting screen 400 is vanished without completing the registration of the job program, and the display state of the display 22*a* is returned to the state shown in FIG. 4.

Figure 8:
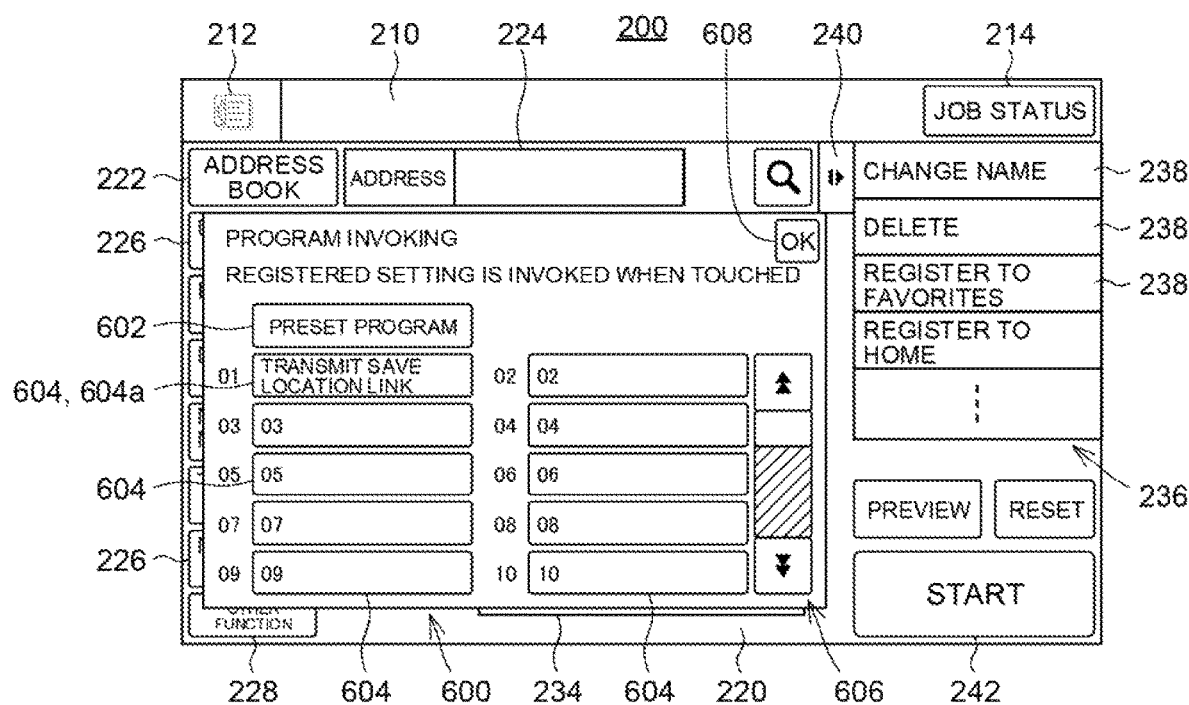
FIG. 8 is an illustration showing an example of a program invoking screen in a fax transmission mode.

It is assumed that the program invoking button 238*a* within the action panel 236 is operated on the fax transmission screen 200 as shown in FIG. 3, on the condition that a job program having the program name "transmit save location link" for the e-mail transmission mode has been registered in the above-described way. In that case, as shown in FIG. 8, a program invoking screen 600, which serves as a small screen smaller than the fax transmission screen 200, is displayed in such a way as to cover a portion of the fax transmission screen 200.

Similarly to the program registration screen 300 (FIG. 5) described above, the program invoking screen 600 is a screen common to all of the operation modes including the fax transmission mode. On the program invoking screen 600, a single preset program invoking button 602, and a plurality of program invoking buttons 604, 604, . . . are disposed. Each of the program invoking buttons 604, 604, . . . is an operation element for invoking a registered job program, and corresponds to each of the program registration buttons 302, 302, . . . on the program registration screen 300, including the arrangement of the respective buttons. That is, a total of forty-eight program invoking buttons 604 are prepared. Further, by the operation on a scroll bar 606, which is disposed on the right side next to a line of program invoking buttons 604, 604, . . . , the program invoking buttons 604, 604, . . . in line can be scrolled. Further, for a program invoking button 604*a* corresponding to the job program whose program number is "1", the aforementioned character string "transmit save location link", which has been set as the program name of this job program, is assigned.

The preset program invoking button 602 is disposed above the line of program invoking buttons 604, 604, . . . , and more specifically, is disposed above the program invoking button 604*a* corresponding to the job program whose program number is "1". The preset program invoking button 602 is an operation element for invoking the initial value (default value) of the operating condition for each of the operation modes.

Further, at an upper right portion of the program invoking screen 600, an OK button 608 is disposed. When the OK button 608 is operated, the display of the program invoking screen 600 is vanished, and the display state of the display 22*a* is returned to the state as shown in FIG. 3. In a state in which the program invoking screen 600 is being displayed, the buttons 238, 238, . . . , within the action panel 236 serve as operation elements for editing the registered job program, or more strictly speaking, for enabling the aforementioned operation to be proceeded.

It is assumed that the program invoking button 604 corresponding to the registered job program, more specifically, the program invoking button 604*a* corresponding to the job program to which the aforementioned program name "transmit save location link", for example, is assigned is operated, on the program invoking screen 600. In that case, the e-mail transmission screen 100 shown in FIG. 4 is displayed on the display 22*a*, instead of the fax transmission screen 200 including the program invoking screen 600. In addition, the operation mode according to the e-mail transmission screen 100 shown in FIG. 4, in other words, the e-mail transmission mode, is set, and the operating condition according to this e-mail transmission screen 100 is set. That is, the same state as that at the time of registering the job program to which the program name "transmit save location link" is assigned is reproduced.

Consequently, a user can intuitively confirm the details of the job program to which the program name "transmit save location link" is assigned. In addition, the user can immediately use (process) the multifunction peripheral 10 according to the operation mode and the operating condition corresponding to the job program to which the program name "transmit save location link" is assigned.

When the preset program invoking button 602 is operated on the program invoking screen 600 shown in FIG. 8, a default value of the operating condition for the fax transmission mode corresponding to the preset program invoking button 602 is invoked. Further, the default value is set, and the fax transmission screen 200 reflecting the setting details corresponding to the default value is also displayed. For example, the fax transmission screen 200 of the initial state shown in FIG. 3 is displayed. A default value of the operating condition for each of the operation modes corresponding to the preset program invoking button 602 is recorded in, for example, a preset table (not shown) different from the job program table 500 described above (FIG. 7). The preset table is also stored in the aforementioned rewritable nonvolatile memory constituting the main storage 16*b*, likewise the job program table 500. Further, the present embodiment may be configured such that the default values recorded in the preset table can also be arbitrarily changed.

In the above specific example, a case where the setting details of the operating condition for the e-mail transmission mode in which the detailed function of transmitting a link for the save location is enabled are invoked from the fax transmission screen 200, which is the operation screen for the fax transmission mode lacking in such detailed function, has been explained. However, the same applies to cases other than the above. That is, regardless of whether a certain detailed function is provided, and regardless of whether the operation modes are the same at the times of registering and invoking the job program, as described above, when the program invoking button 604 corresponding to the registered job program is operated, the same state as that at the time of registering the job program is reproduced.

Next, as another specific example, a case where certain setting details of an operating condition for the e-mail transmission mode are registered, and the setting details are invoked from a shared folder transmission mode, which is a yet another mode different from the e-mail transmission mode and the above-described fax transmission mode, will be described.

Figure 9:
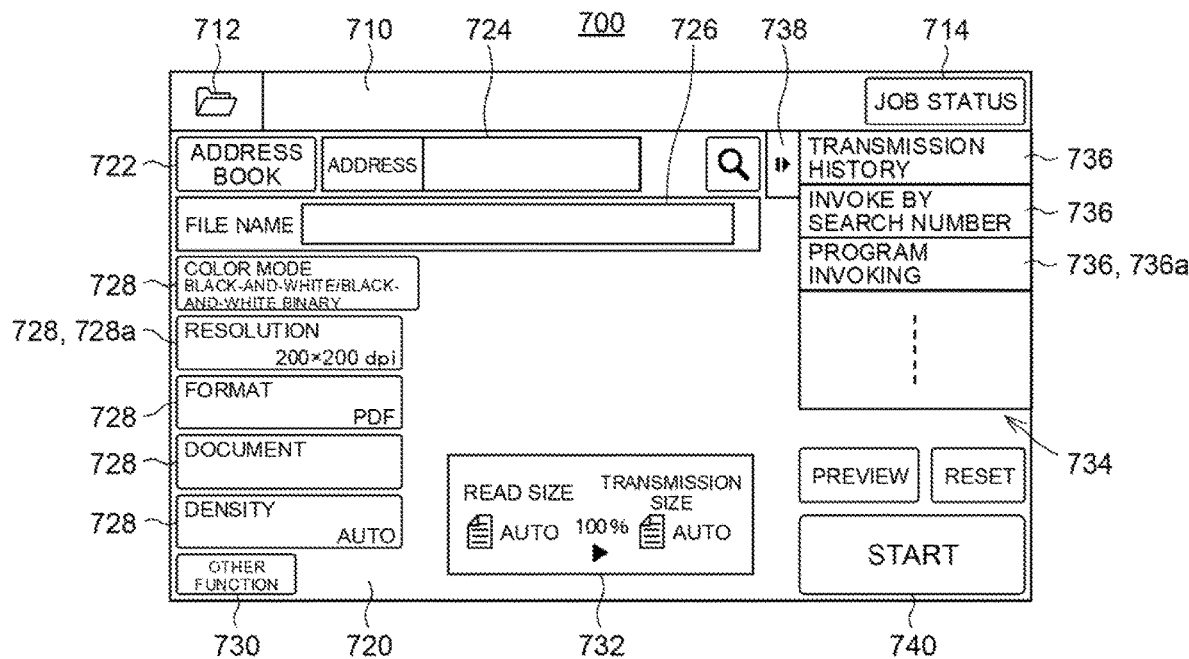
FIG. 9 is an illustration showing the initial state of a shared folder transmission screen in one embodiment of the present invention.

The e-mail transmission screen 100 serving as the operation screen for the e-mail transmission mode has been described above. In the shared folder transmission mode, as the operation screen for this mode, a shared folder transmission screen 700 as shown in FIG. 9 is displayed on the display 22*a*. Note that the shared folder transmission screen 700 illustrated in FIG. 9 shows the initial state of the shared folder transmission screen 700.

As in the e-mail transmission screen 100, the shared folder transmission screen 700 also includes a strip-shaped display area 710 and a main display area 720. At a left end portion of the strip-shaped display area 710 of these areas, a mode mark 712 appropriate as a title mark of the shared folder transmission screen 700 is disposed. In addition, at a right end portion of the strip-shaped display area 710, a job status confirmation button 714 similar to that of (the strip-shaped display area 110 of) the e-mail transmission screen 100 is disposed.

Meanwhile, at an upper left portion of the main display area 720, an address book button 722 similar to that of (the main display area 120 of) the e-mail transmission screen 100 is disposed. Further, on the right side next to the address book button 722, a field 724 for specifying a shared folder to be treated as the transmission destination (address) is disposed. Further, below the address book button 722 and the field 724 for destination entry, a field 726 for file name entry similar to that of the e-mail transmission screen 100 is disposed.

In addition, a plurality of setting buttons 728, 728, . . . similar to those of the e-mail transmission screen 100 are disposed in tandem at a leftward portion of the main display area 720 below the field 726 for file name entry. As one of these setting buttons 728, 728, . . . , a resolution setting button 728*a* similar to that of the e-mail transmission screen 100 is provided. As in the e-mail transmission screen 100, to the resolution setting button 728a, a character string representing the currently set reading resolution, more specifically, a character string "200×200 dpi" in this case, is assigned. Further, at a lower left portion of the main display area 720 below the arrangement of these setting buttons 728, 728, . . . , other function display button 730 similar to that of the e-mail transmission screen 100 is disposed. Also, in the lower portion of the center of the main display area 720, a display area 732 similar to that of the e-mail transmission screen 100 is disposed.

Furthermore, at an upper right portion of the main display area 720, an action panel 734 is disposed. A plurality of buttons 736, 736, . . . are disposed in tandem within the action panel 734. These buttons 736, 736, . . . are operation elements corresponding to detailed functions that can be used in the shared folder transmission mode. As one of these buttons 736, 736, . . . , a program invoking button 736a similar to that of the e-mail transmission screen 100 is provided. Also, a tab 738 for opening and closing the action panel 734 is placed at an upper left portion of the action panel 734.

Further, a start button 740 is disposed at a lower right portion of the main display area 720. The start button 740 is an operation element for starting transmission of a file (image data) according to the shared folder transmission mode. That is, as the start button 740 is operated after the settings of items necessary for transmission of a file in the shared folder transmission mode have been completed, the transmission of the file according to the shared folder transmission mode is started. Note that elements such as various buttons besides the above-described features are disposed on the shared folder transmission screen 700 including the main display area 720 and the strip-shaped display area 710 described above. However, explanation will be omitted for such elements not directly related to the gist of the present invention.

Figure 10:
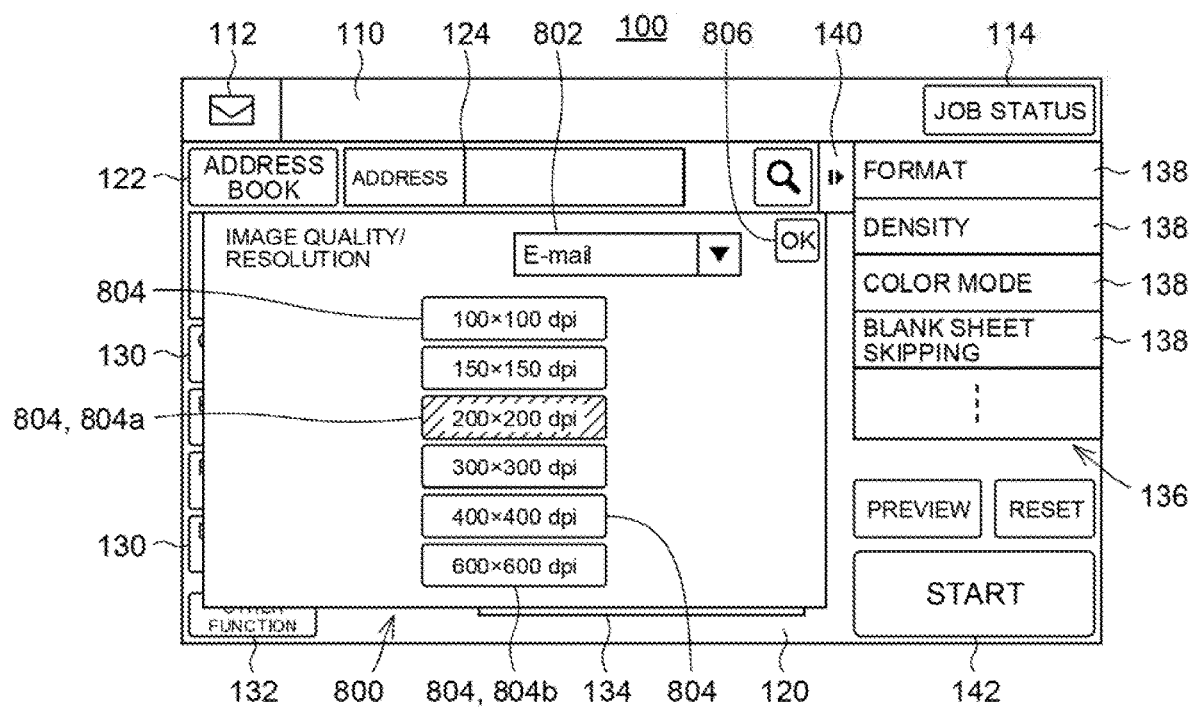
FIG. 10 is an illustration showing an example of the initial state of a resolution setting screen in the e-mail transmission mode.

Here, it is assumed that the resolution setting button 130a is operated on the e-mail transmission screen 100 shown in FIG. 2, for example. In that case, as shown in FIG. 10, a resolution setting screen 800, which serves as a small screen smaller than the e-mail transmission screen 100, is displayed in such a way as to cover a portion of the e-mail transmission screen 100.

The resolution setting screen 800 is a screen common to operation modes in which the setting of the resolution for reading a document by the image scanner mode can be made, including the e-mail transmission mode. Such operation modes include the shared folder transmission mode as will be described later, for example, in addition to the e-mail transmission mode. A drop-down list 802 is disposed at a portion, which is somewhat closer to the right side, of the upper portion of the resolution setting screen 800. The drop-down list 802 is a selection operation element for selecting an operation mode to which the setting of the reading resolution through the resolution setting screen 800 is applied. When the resolution setting screen 800 is displayed as a result of the resolution setting button 130a being operated on the e-mail transmission screen 100, the drop-down list 802 is in the state in which the e-mail transmission mode (E-mail) is selected, as the initial state.

Further, a plurality of resolution selection buttons 804, 804, . . . are disposed in tandem below the drop-down list 802. These resolution selection buttons 804, 804, . . . are operation elements for setting (selecting) the resolution for reading a document by the image scanner function, or more strictly speaking, for enabling the aforementioned operation to be proceeded. In the initial state before the setting of a reading resolution is made, a value, which is "200×200 dpi", is set as the reading resolution. In order to enable the user to intuitively understand that "200×200 dpi" is a preset value, a resolution selection button 804a corresponding to the reading resolution of "200×200 dpi" is displayed in a way different from the way in which the other resolution selection buttons 804, 804, . . . are displayed, and is colored in an appropriate color, for example.

Furthermore, an OK button 806 is disposed at an upper right portion of the resolution setting screen 800. The OK button 806 is an operation element for executing the setting of the reading resolution through the resolution setting screen 800. That is, as the OK button 806 is operated, the setting of the reading resolution through the resolution setting screen 800 is executed. After that, the display of the resolution setting screen 800 is vanished, and the display state of the display 22a is shifted to a state in which the e-mail transmission screen 100 is displayed, as shown in FIG. 2. On the e-mail transmission screen 100 after the shifting, a value of the reading resolution set through the resolution setting screen 800 is reflected on the character string representing the reading resolution assigned to the resolution setting button 130a. In a state in which the resolution setting screen 800 is displayed as shown in FIG. 10, the buttons 138, 138, . . . within the action panel 136 serve as operation elements for setting parameters other than the resolution for reading a document by the image scanner function, or more strictly speaking, for proceeding to the setting operation.

Figure 11:
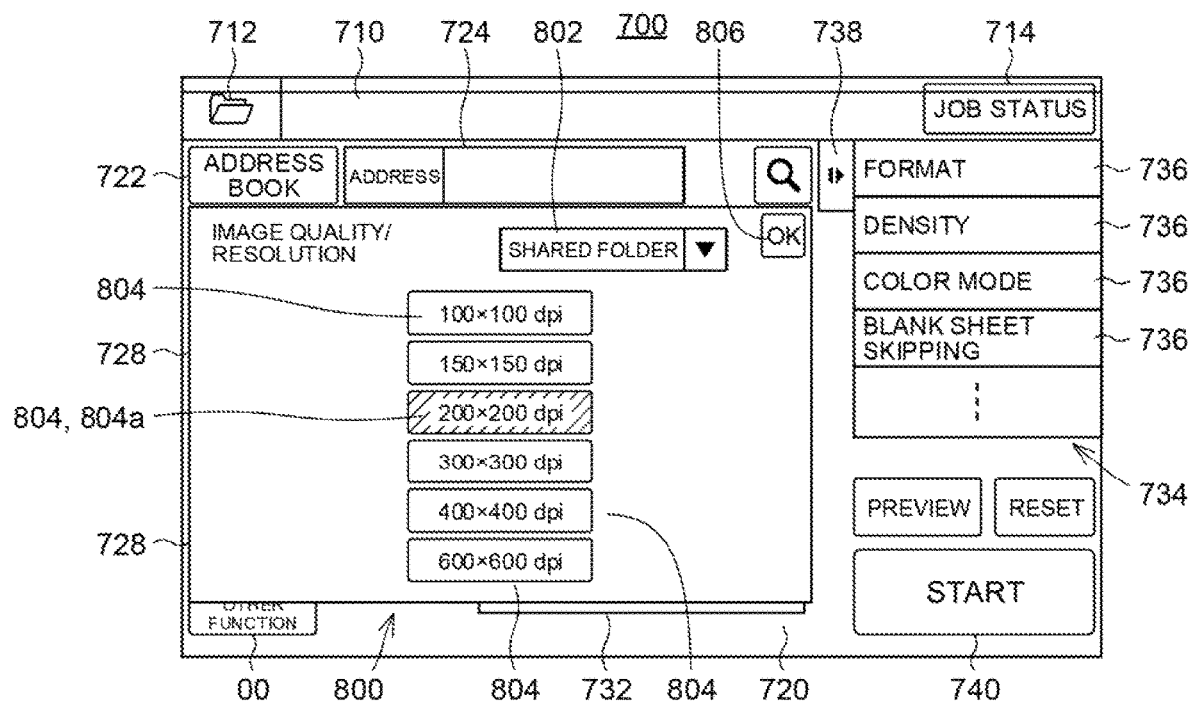
FIG. 11 is an illustration showing an example of the initial state of a resolution setting screen in a shared folder transmission mode.

On the other hand, it is assumed that the resolution setting button 728a is operated on the shared folder transmission screen 700, as shown in FIG. 9. Also, in this case, as shown in FIG. 11, a resolution setting screen 800 similar to that shown in FIG. 10 is displayed in such a way that a portion of the shared folder transmission screen 700 is covered.

When the resolution setting screen 800 is displayed as a result of the resolution setting button 728a being operated on the shared folder transmission screen 700, the drop-down list 802 is in the state in which the shared folder transmission mode is selected, as the initial state. Also, in this case, inn the initial state before the setting of the resolution for reading a document by the image scanner function is made, the resolution setting screen 800 is in a state in which the value, which is "200×200 dpi", is set as the reading resolution. More specifically, the resolution setting screen 800 is in a state in which the resolution selection button 804a corresponding to the reading resolution of "200×200 dpi" is displayed in a way different from the way in which the other resolution selection buttons 804, 804, . . . are displayed.

Further, when the OK button 806 disposed at the upper right portion of the resolution setting screen 800 is operated, the setting of the reading resolution through the resolution setting screen 800 is executed. After that, the display of the resolution setting screen 800 is vanished, and the display state of the display 22a is shifted to a state in which the shared folder transmission screen 700 is displayed, as shown in FIG. 9. Also, on the shared folder transmission screen 700 after the shifting, a value of the reading resolution set through the resolution setting screen 800 is reflected on the character string representing the reading resolution assigned to the resolution setting button 728a. In a state in which the resolution setting screen 800 is displayed as shown in FIG. 11, the buttons 736, 736, . . . within the action panel 734 serve as operation elements for setting parameters other than the resolution for reading a document by the image scanner function, or more strictly speaking, for proceeding to the setting operation.

Figure 12:
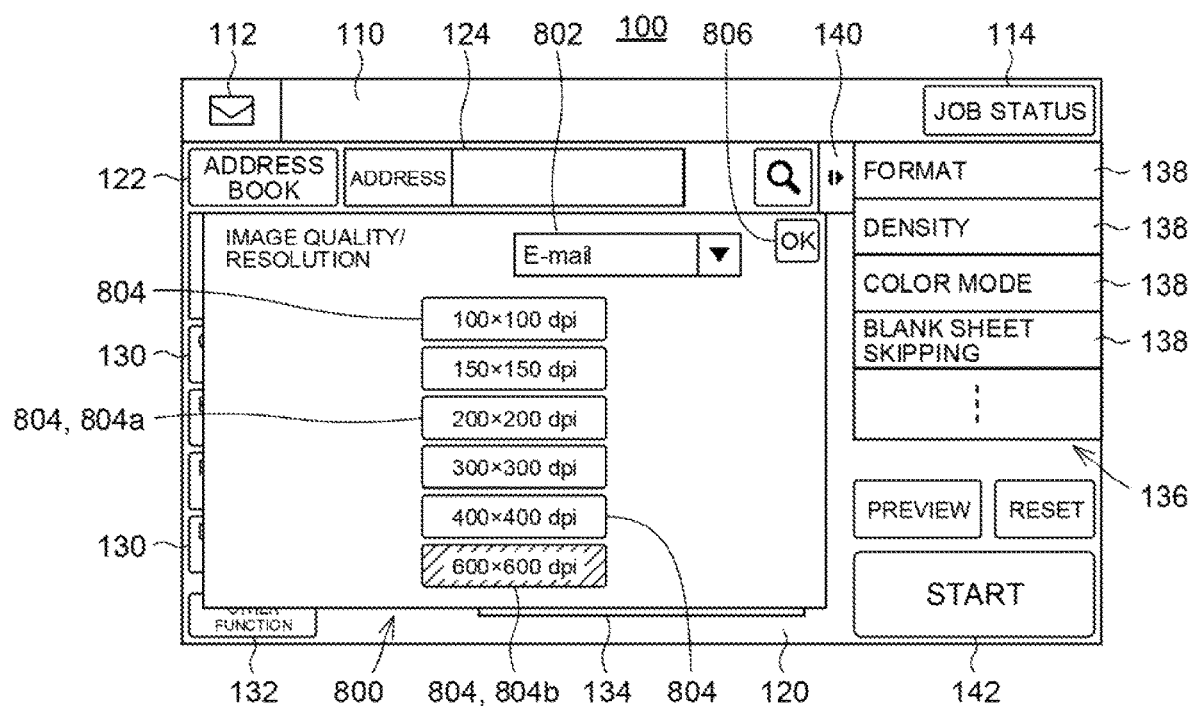
FIG. 12 is an illustration showing an example of another state of the resolution setting screen in the e-mail transmission mode.

Referring to FIG. 10 again, it is assumed that a resolution selection button 804b corresponding to the resolution of "600×600 dpi" is operated, on the resolution setting screen 800 shown in FIG. 10. In that case, the resolution setting screen 800 is shifted to a mode as shown in FIG. 12. That is, the resolution setting screen 800 is in a state in which the resolution selection button 804b corresponding to the resolution of "600×600 dpi" is selected, instead of the resolution selection button 804a corresponding to the resolution of "200×200 dpi".

Figure 13:
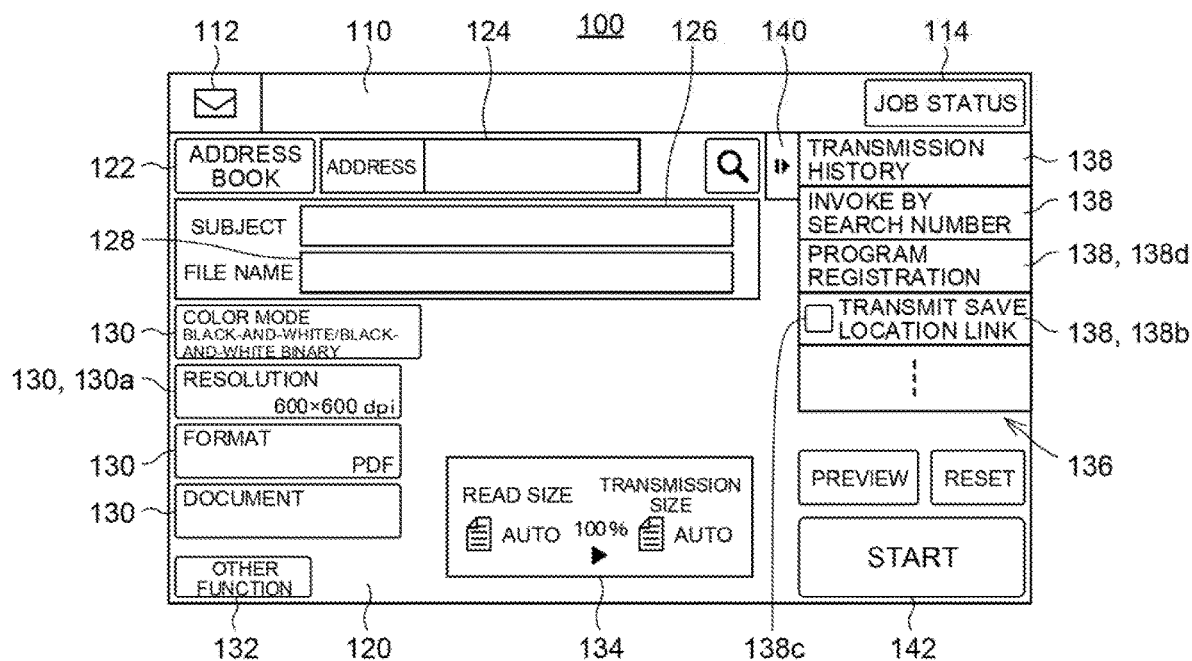
FIG. 13 is an illustration showing an example of another state of the e-mail transmission screen.

After that, it is assumed that the OK button 806 is operated on the resolution setting screen 800 shown in FIG. 12. In that case, the display of the resolution setting screen 800 is vanished, and the e-mail transmission screen 100 is shifted to a mode as shown in FIG. 13. That is, the character string representing the resolution for reading a document assigned to the resolution setting button 130a is changed to "600×600 dpi". Thereby, the resolution for reading a document being set to "600×600 dpi" is expressed. In addition, the program registration button 138d is disposed, instead of the aforementioned program invoking button 138a within the action panel 136.

Figure 14:
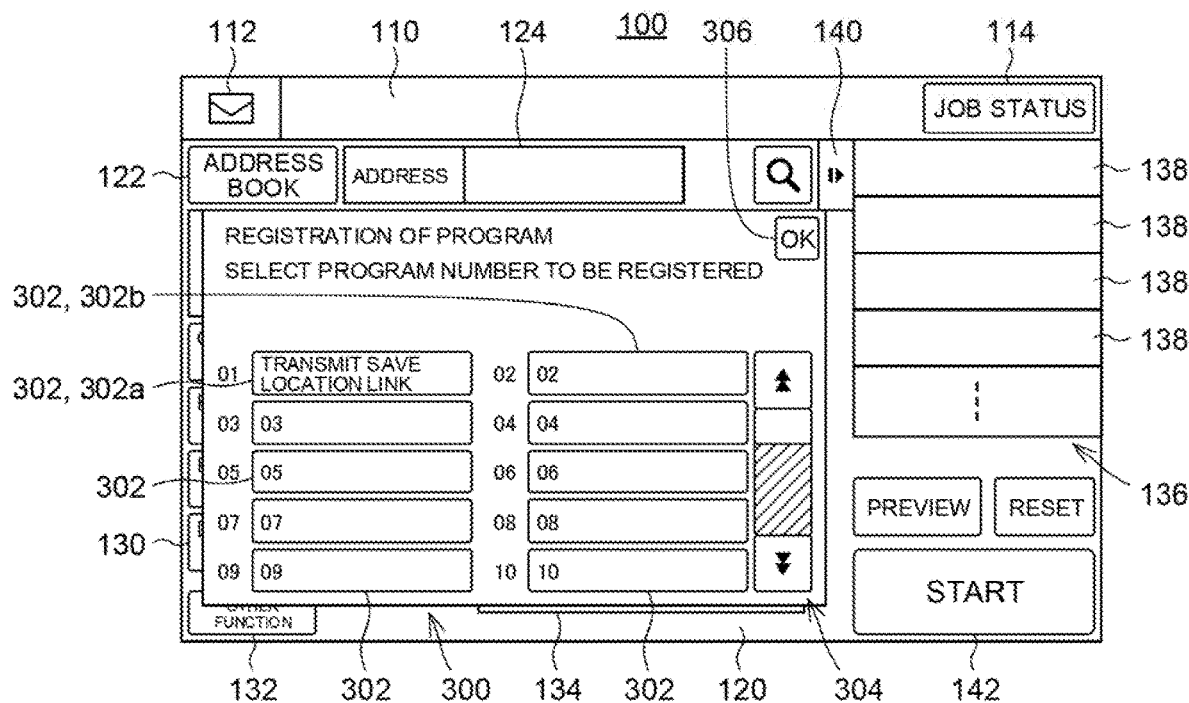
FIG. 14 is an illustration showing an example of another state of the program registration screen in the e-mail transmission mode.

It is assumed that the program registration button 138d within the action panel 136 is operated, in order to register the setting details through the e-mail transmission screen 100, on the e-mail transmission screen 100 shown in FIG. 13. In that case, as shown in FIG. 14, a program registration screen 300 similar to that shown in FIG. 5 is displayed in such a way that a portion of the e-mail transmission screen 100 is covered. Note that FIG. 14 shows the state in which the job program to which the aforementioned program name, i.e., "transmit save location link", is assigned has already been registered.

In the program registration screen 300 shown in FIG. 14, it is assumed that an arbitrary program registration button 302 by which a job program is yet to be registered is operated, that is, a program registration button 302b corresponding to the program number "2", for example, is operated. In that case, as shown m FIG. 15, a program name setting screen 400 similar to the one as shown in FIG. 6 is displayed, instead of the program registration screen 300. On the other hand, when the OK button 306 is operated, the display of the program registration screen 300 is varnished as described above, and the display state of the display 22a is returned to the state as shown in FIG. 13.

Figure 15:
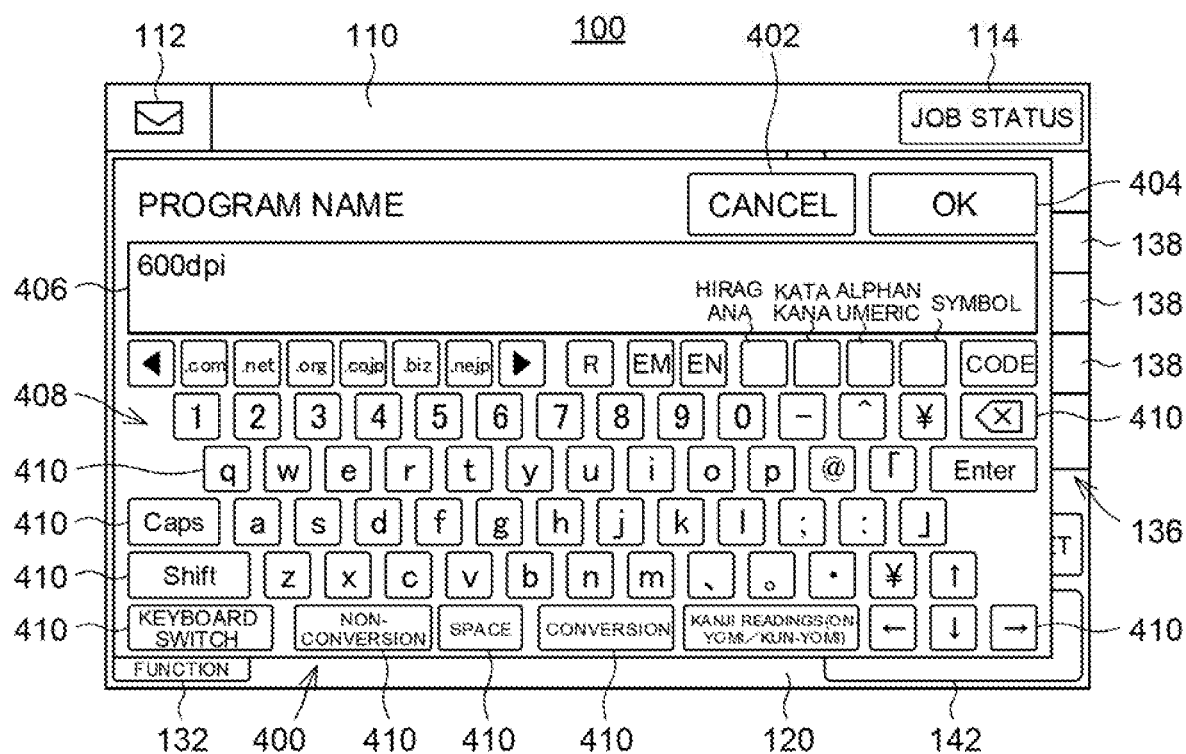
FIG. 15 is an illustration showing an example of another state of the program name setting screen in the e-mail transmission mode.

FIG. 15 shows the state in which a character string "600 dpi" has already been entered in the field 406 for program name entry on the program name setting screen 400. Entry of a character string in this field 406 is carried out by an operation of the software keyboard 408. Also, as described above, in the initial state of the program name setting screen 400, a character string (a character string "02" in this case) representing the corresponding program number is entered in the field 406.

It is assumed that an OK button 404, for example, is operated, on program name setting screen 400 shown in FIG. 15. In that case, setting details shown in FIG. 13 are registered as a job program whose program number is "02", in such a state that the setting details are associated with the corresponding operation mode (e-mail transmission mode). That is, the program number, the program name, the operation mode, and the setting details are recorded in the job program table 500 described above (FIG. 7), in such a state that they are associated with each other. Further, after the message screen as mentioned above is displayed for a certain period, in place of the program name setting screen 400, the display state of the display 22a is returned to the state shown in FIG. 13. On the other hand, when a cancel button 402 is operated, the display of the program name setting screen 400 is vanished without completing the registration of the job program, and the display state of the display 22a is returned to the state shown in FIG. 13.

Figure 16:
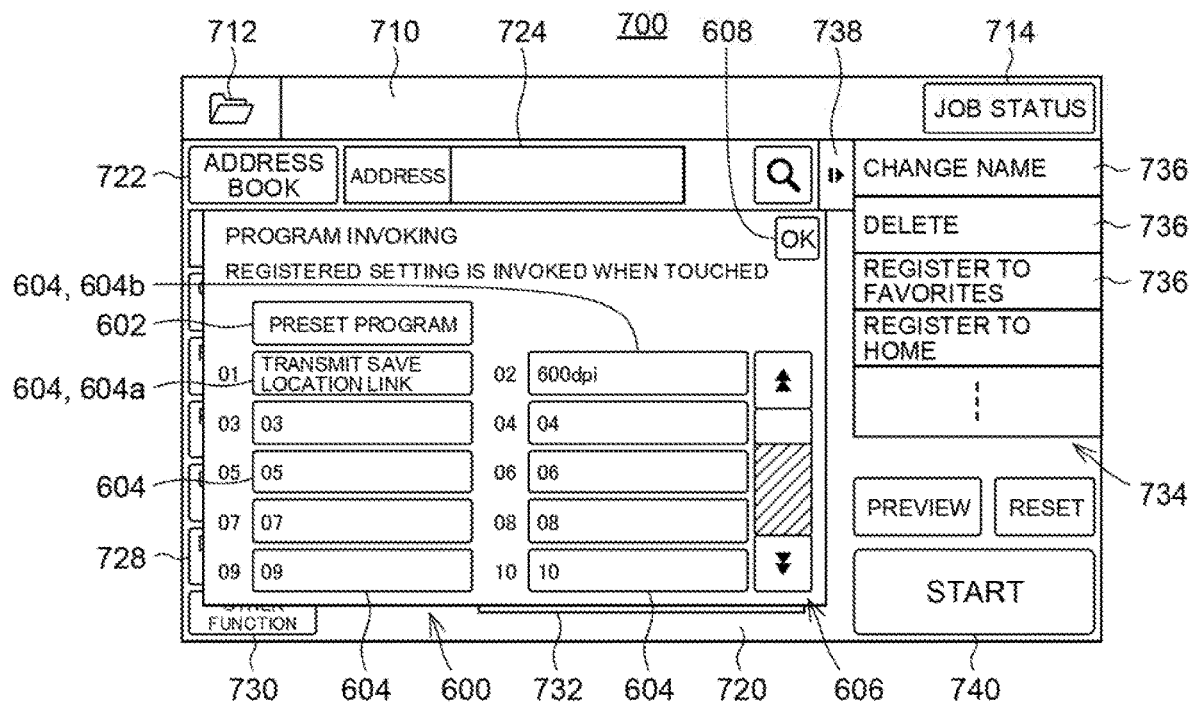
FIG. 16 is an illustration showing an example of a program invoking screen in the shared folder transmission mode.

It is assumed that the program invoking button 736a within the action panel 734 is operated on the shared folder transmission screen 700 as shown in FIG. 9, on the condition that a job program having the program name "600 dpi" for the e-mail transmission mode has been registered in the above-described way. In that case, as shown in FIG. 16, a program invoking screen 600 similar to that shown in FIG. 8 is displayed in such a way that a portion of the shared folder transmission screen 700 is covered. As in FIG. 14, FIG. 16 also shows the state in which the job program to which the program name, i.e., "transmit save location link", is assigned has already been registered.

It is assumed that an arbitrary program invoking button 604 corresponding to the registered job program, more specifically, the program invoking button 604b corresponding to the job program to which the program name "600 dpi" is assigned, for example, is operated, on the program invoking screen 600 shown in FIG. 16. In that case, the e-mail transmission screen 100 shown in FIG. 13 is displayed on the display 22a, instead of the shared folder transmission screen 700 including the program invoking screen 600. In addition, the operation mode according to the e-mail transmission screen 100 shown in FIG. 13, in other words, the e-mail transmission mode, is set, and the operating condition according to this e-mail transmission screen 100 is set. That is, the same state as that at the time of registering the job program to which the program name "600 dpi" is assigned is reproduced.

Consequently, a user can intuitively confirm the details of the job program to which the program name "600 dpi" is assigned. In addition, the user can immediately use the multifunction peripheral 10 according to the operation mode and the operating condition corresponding to the job program to which the program name "600 dpi" is assigned.

Note that when the program invoking button 604a corresponding to the job program to which the program name "transmit save location link" is assigned is operated, on the program invoking screen 600 shown in FIG. 16, the same state as that at the time of registering the job program is reproduced as described above (that is, the e-mail transmission screen 100 shown in FIG. 4 is displayed on the display 22a). Also, when the preset program invoking button 602 is operated, a default value of the operating condition for the shared folder transmission mode is invoked, and a state according to the default value is produced.

In this example which may be called a second specific example, a case where the setting details of the operating condition for the mail transmission mode in which the resolution for reading a document by the image scanner mode is changed as appropriate are invoked from the shared folder transmission screen 700, which is the operation screen for the shared folder transmission mode in which the reading resolution can be similarly changed, has been explained. However, the same applies to cases other than the above. That is, regardless of whether the same parameter can be changed, and regardless of whether the operation modes are the same at the times of registering and invoking the job program, as described above, when the program invoking button 604 corresponding to the registered job program is operated, the same state as that at the time of registering the job program is reproduced.

Figure 17:
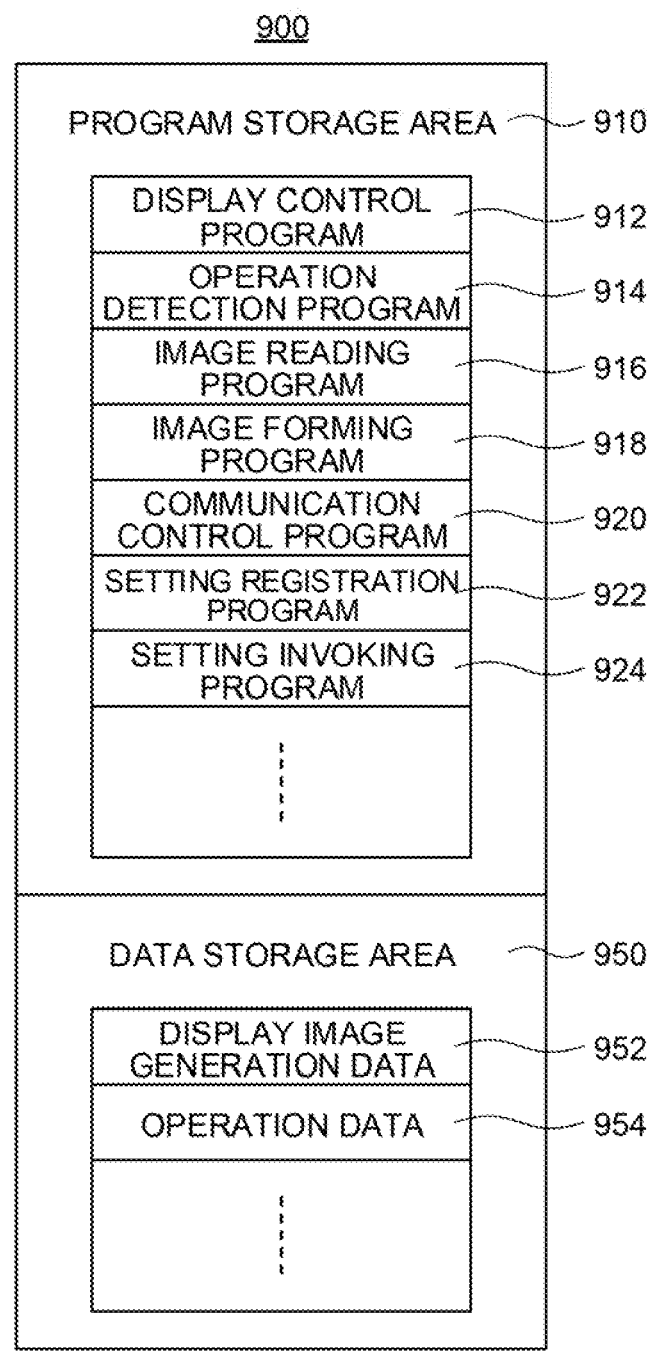
FIG. 17 is a memory map conceptually representing a configuration in a RAM of a main storage in one embodiment of the present invention.

Here, FIG. 17 shows a memory map 900 conceptually representing a configuration in the RAM of the main storage 16b.

As shown in the memory map 900, the RAM includes a program storage area 910, and a data storage area 950. In the program storage area 910 among the above areas, the control program described above is stored. Specifically, the control program includes a display control program 912, an operation detection program 914, an image reading program 916, an image forming program 918, a communication control program 920, a setting registration program 922, a setting invoking program 924, and the like.

The display control program 912 is a program for generating display screen data necessary for displaying various screens such as the e-mall transmission screen 100 on the display 22a. The operation detection program 914 is a program for detecting a state of operation on the touch panel 24a. The image reading program 916 is a program for controlling the image reader 12. The image forming program 918 is a program for controlling the image former 14. The communication control program 920 is a program for controlling the communicator 20. The setting registration program 922 is a program for controlling the operation of the CPU 16a in registering the setting details of an operating condition for an arbitrary operation mode, in other words, a job program. Further, the setting invoking program 924 is a program for causing the CPU 16a to execute a setting invoking task to be described later.

Meanwhile, in the data storage area 950, various kinds of data are stored. The various kinds of data include display image generation data 952, operation data 954, and the like.

The display image generation data 952 is data such as polygon data and texture data used for generating display screen data, on the basis of the display control program 912 described above. The operation data 954 is data representing the state of operation on the touch panel 24a, and is more specifically, time-series data representing a position (coordinates) where the user has touched the touch panel 24a.

Figure 18:
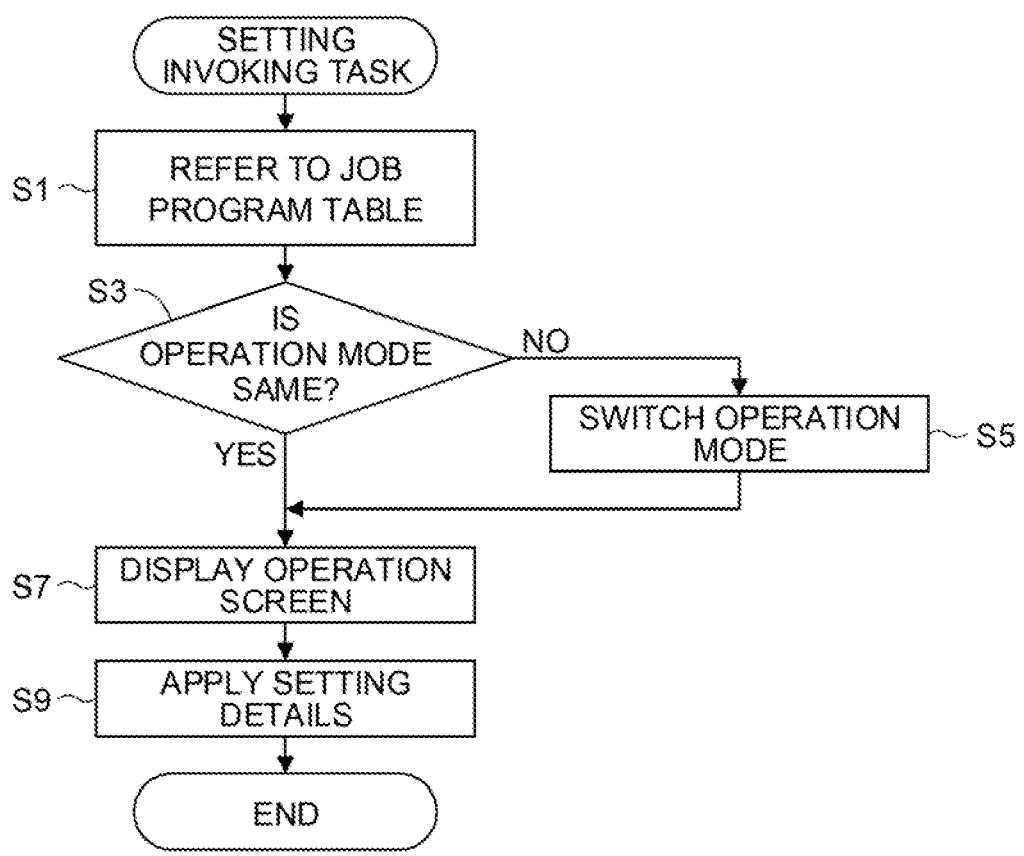
FIG. 18 is a flowchart showing the flow of a setting invoking task executed by a CPU in one embodiment of the present invention.

As described above, according to the present embodiment, the same state as that at the time of registering a job program is reproduced. In order to realize the above, the CPU 16a executes the setting invoking task in accordance with the setting invoking program 924 described above (FIG. 17). A flow of the setting invoking task is illustrated in FIG. 18. Note that the CPU 16a executes the setting invoking task in response to operation on any one of the programs invoking buttons 604 or the preset program invoking button 602, on the program invoking screen 600 described above (IM. 8 or FIG. 16).

According to the setting invoking task, the CPU 16a first refers to the job program table 500, in step S1. Then, the CPU 16a shifts the processing to step S3.

In step S3, the CPU 16a compares the operation mode that has currently been set with the operation mode to be reproduced, and determines whether the two modes are the same. Here, for example, if the operation modes are the same as each other (S3: YES), the CPU 16a shifts the processing to step S7 which will be described later. Meanwhile, if the operation modes are not the same as each other (S3: NO), the CPU 16a shifts the processing to step S5.

In step S5, the CPU 16a sets an operation mode to be reproduced, on the basis of a result of reference to the job program table 500 in step S1. After that, the CPU 16a shifts the processing to step S7.

In step S7, the CPU 16a causes an operation screen to be displayed on the display 22a, on the basis of the result of reference to the job program table 500 in step S1, and more specifically, causes the operation screen to be displayed after the display of the program invoking screen 600 as described above has been vanished. Then, the CPU 16a shifts the processing to step S9.

In step S9, the CPU 16a applies the setting details of the operating condition to be reproduced, on the basis of the result of reference to the job program table 500 in step S1. With the above, the CPU 16a finishes a sequence of steps of the setting invoking task.

As described above, according to the present embodiment, setting details of an operating condition for an arbitrary operation mode are registered as a job program, and the same state as that at the time of registering the job program can be reproduced by invoking the registered setting when necessary. Being able to do so is extremely beneficial to the multifunction peripheral 10 having a plurality of operation modes to improve the operability, in particular.

Note that the present embodiment is one specific example for realizing the present invention, and is not intended to limit the technical scope of the present invention. That is, the present invention is also applicable to aspects other than that of the present embodiment.

For example, the present invention can be applied not only to the image scanner mode including the e-mail transmission mode and the shared folder transmission mode, or the fax transmission mode, but also to a case where the copy mode is employed. That is, the present invention can be applied to cases where a job program registered in a copy mode is to be invoked from an arbitrary operation mode, and where a job program registered in an arbitrary operation mode is to be invoked from the copy mode.

Also, the operator 24 may not include the touch panel 24a, in other words, the operator 24 and the display unit 22 including the display 22a may be completely different structures.

Further, in the present embodiment, an example in which the present invention is applied to the multifunction peripheral 10 has been explained. However, the present embodiment is not limited to the above. As a matter of course, the present invention can be applied to an information processor other than the multifunction peripheral 10.

Note that an operating condition of a corresponding operating mode is set, on the basis of details set through an operation screen such as the e-mail transmission screen 100 described above, in other words, on the basis of the user's setting operation. Here, the setting of the operating condition is managed by the CPU 16a. The CPU 16a as described above is an example of setting means according to the present invention. Also, the CPU 16a causes each of the operation screens to be displayed on the display 22a. The CPU 16a as described above is also an example of first display control means according to the present invention.

Further, in response to the user's registration operation including the operation on the program registration screen 300 described above (FIG. 5 or FIG. 14), the job program is recorded in the job program table 500 described above (FIG. 7). A rewritable nonvolatile memory in the main storage 16b in which the job program table 500 is stored is an example of storage means according to the present invention. Furthermore, in response to the user's invoking operation including the operation on an arbitrary program invoking button 604 on the program invoking screen 600 described above (FIG. 8 or FIG. 16), a job program is invoked. Here, the invoking of the job program is managed by the CPU 16a. The CPU 16a as described above is an example of invoking means according to the present invention.

Also, on the program invoking screen 600, program names of job programs that have been registered are assigned to respective program invoking buttons 604 corresponding to these job programs. The program invoking screen 600 including such program invoking buttons 604, in other words, including a list of program names of the job programs, is also displayed on the display 22*a* in accordance with control by the CPU 16*a*. The CPU 16*a* in charge of displaying the program invoking screen 600 on the display 22*a* is also an example of second display control means according to the present invention.

What is claimed is:

1. An information processor comprising an image reading unit bearing image reading processing which reads an image of an original to put image data according to the image of the original, and including a plurality of operation modes including execution of the image reading processing by the image reading unit, the information processor performs the image reading processing to:
 set an operating condition for an arbitrary operation mode of the plurality of operation modes in accordance with a setting operation by a user;
 display, on a display surface included in a display, setting information representing setting details of the operating condition set;
 store, in a memory, the setting details in response to a registration operation performed by the user;
 invoke, in response to an invoking operation performed by the user, the setting details according to the invoking operation from the memory; and
 set the operating condition according to the setting details invoked and the operation mode corresponding to the operating condition for execution of processing according to an operation condition and the operation mode, and display the setting information representing the setting details on the display surface.

2. The information processor according to claim 1, wherein the information processor invokes the setting details of the operation mode different from the operation mode currently set.

3. The information processor according to claim 1, wherein the information processor further displays list information, which is a list of the setting details stored in the memory, on the display surface.

4. The information processor according to claim 1, wherein the information processor further receives the setting operation, the registration operation, and the invoking operation, wherein the image reading unit includes a touch panel provided to overlap the display surface.

5. The information processor according to claim 1, wherein the information processor including the plurality of operation modes is a multifunction peripheral.

6. A non-transitory computer-readable recording medium storing a setting control program for an information processor comprising an image reading unit bearing image reading processing which reads an image of an original to output image data according to the image of the original, and including a plurality of operation modes including execution of the image reading processing by the image reading unit, the setting control program causing a computer of the information processor to implement:
 a setting procedure of setting an operating condition for an arbitrary operation mode of the plurality of operation modes in accordance with a setting operation performed by a user;
 a first display control procedure of displaying, on a display surface of a display of the information processor, setting information representing setting details of the operating condition according to the setting procedure;
 a storage procedure of storing the setting details in a storage of the information processor in response to a registration operation performed by the user;
 an invoking procedure of invoking, in response to an invoking operation performed by the user, the setting details according to the invoking operation from the storage; and
 a setting control procedure of setting the operating condition according to the setting details invoked in the invoking procedure and the operation mode corresponding to the operating condition for execution of processing according to an operation condition and the operation mode, and displaying the setting information representing the setting details on the display surface.

7. A setting control method for an information processor comprising an image reading unit bearing image reading processing which reads an image reading unit bearing image reading processing which reads an image of an original to output image data according to the image of the original, and including a plurality of operation modes including execution of the image reading processing by the image reading unit, the setting control method comprising:
 setting an operating condition for an arbitrary operation mode of the plurality of operation modes in accordance with a setting operation performed_by a user;
 displaying, on a display surface of a display of the information processor, setting information representing setting details of the operating condition according to the setting;
 storing the setting details in a storage of the information processor in response to a registration operation performed by the user;
 invoking, in response to an invoking operation performed by the user, the setting details according to the invoking operation from the storage; and
 setting the operating condition according to the setting details invoked by the invoking and the operation mode corresponding to the operating condition for execution of processing according to an operation condition and the operation mode, and displaying the setting information representing the setting details on the display surface.

* * * * *